(12) United States Patent
Okoshi et al.

(10) Patent No.: US 6,880,399 B1
(45) Date of Patent: Apr. 19, 2005

(54) ANGULAR VELOCITY SENSOR

(75) Inventors: Hideo Okoshi, Osaka (JP); Toshiyuki Nozoe, Kyoto (JP); Tomomasa Omawari, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/629,826

(22) Filed: Jul. 30, 2003

Related U.S. Application Data

(63) Continuation-in-part of application No. PCT/JP02/12311, filed on Nov. 26, 2002.

(30) Foreign Application Priority Data

Nov. 29, 2001 (JP) ........................................ 2001-364071

(51) Int. Cl.⁷ ................................................ G01P 9/04
(52) U.S. Cl. ...................................... 73/493; 73/504.16
(58) Field of Search .................... 73/493, 431, 504.15, 73/504.16, 504.12; 310/345, 370

(56) References Cited

U.S. PATENT DOCUMENTS 5,668,316 A * 9/1997 Iwai et al. .................... 73/493
5,942,685 A * 8/1999 Tabota .......................... 73/493
6,199,429 B1 * 3/2001 Hirosawa .................. 73/504.15

FOREIGN PATENT DOCUMENTS

| EP | 1132712 | * 9/2001 |
|---|---|---|
| JP | 4-259104 | 9/1992 |
| JP | 6-291551 | 10/1994 |
| JP | 6-303082 | 10/1994 |
| JP | 9-166447 | 6/1997 |
| JP | 10-332378 | 12/1998 |
| JP | 11-230758 | 8/1999 |
| JP | 11-287658 | 10/1999 |
| JP | 2000-292173 | 10/2000 |

* cited by examiner

Primary Examiner—Helen Kwok
(74) Attorney, Agent, or Firm—Wenderoth, Lind & Ponack, L.L.P.

(57) ABSTRACT

A vibrator is received within a case and the case is contained in a containing portion. Further, the case is arranged to be supported by the surrounding terminals having first ends thereof embedded in the containing portion. By virtue of the described configuration, the vibrator is securely retained by the case even if strong vibrations are applied to the terminals. With this configuration, an angular velocity sensor ensuring the strength to retain the vibrator even if the vibrator is reduced in size and causing no degradation of the output characteristic even when subjected to strong vibrations can be provided.

20 Claims, 20 Drawing Sheets

ANGULAR VELOCITY SENSOR

This application is a Continuation-In-Part of International Application PCT/JP02/12311, filed Nov. 26, 2002.

TECHNICAL FIELD

The present invention relates to an angular velocity sensor for use in attitude control of mobile units such as aircraft and vehicles, navigation system, and the like.

BACKGROUND ART

In conventional angular velocity sensors disclosed, for example, in Japanese Patent Non-examined Publication No. H10-332378, a vibrator is directly supported by terminals. The conventional angular velocity sensor will be described below with reference to the accompanying drawings. FIG. 21 is a perspective view of the conventional angular velocity sensor and FIG. 22 is a circuit diagram of the angular velocity sensor.

In FIG. 21 and FIG. 22, vibrator 1 in a rectangular parallelepiped shape is constructed by laminating first piezoelectric substrate 2 to second piezoelectric substrate 4 via electrode layer 3. On the top side of vibrator I, there are provided two split electrodes 5 serving for both driving and detecting roles, while on the underside, there is provided common electrode 6. Four terminals 7 substantially in a Z-shape are each held in place by having widened portion 8 at one end thereof soldered to split electrode 5 of vibrator 1 at a nodal point of vibration of vibrator 1. The other end is projected to the outside. Such an angular velocity sensor has a circuit configuration as shown in FIG. 22. More specifically, split electrodes 5 are each connected with one output terminal of oscillator circuit 9 as the driving source via respective resistors 10, while common electrode 6 is connected with the other output terminal of oscillator circuit 9. Further, split electrodes 5 are each connected to noninverting input (+) and inverting input (−) of differential amplifier 12 via respective resistors 11. Further, the output terminal of differential amplifier 12 and inverting input (−) of differential amplifier 12 are connected by resistor 13.

Operation will be described of the conventional angular velocity sensor configured as above.

Oscillator circuit 9 outputs a driving signal such as a sinusoidal wave signal and applies it to split electrodes 5 of vibrator 1 via resistors 10. Then, first piezoelectric substrate 2 and second piezoelectric substrate 4 generate bending vibrations perpendicularly to their principal planes. If vibrator 1 rotates round its center axis, a Coriolis force corresponding to the rotational angular velocity is generated. The Coriolis force generated at this time acts in a direction parallel to the principal planes of first piezoelectric substrate 2 and second piezoelectric substrate 4 and perpendicular to the center axis of vibrator 1. By this Coriolis force, the direction of the bending vibration of vibrator 1 is changed and, hence, split electrodes 5 generate a signal corresponding to the angular velocity. Then, differential amplifier 12 detects the signal generated in split electrodes 5 via resistors 11 and, thus, the angular velocity applied to the angular velocity sensor is detected.

In the described configuration, terminals 7 are held in place by being soldered to split electrodes 5 of vibrator 1 at nodal points of vibration of vibrator 1. Accordingly, if the area of each node of vibration is reduced in order to obtain a smaller-sized vibrator 1, it also becomes necessary to make corresponding terminals 7 and widened portions 8 smaller. Consequently, the strength for holding vibrator 1 is lowered.

Therefore, when the angular velocity sensor is subjected to strong vibrations, the connections between vibrator 1 and terminals 7 becomes unstable and the output characteristic of the angular velocity sensor is deteriorated.

DISCLOSURE OF INVENTION

The angular velocity sensor of the present invention is configured such that the vibrator is received within a case, the case is contained in a containing portion, and the case is supported by terminals having first ends thereof embedded in the containing portion and second ends thereof electrically connected with the vibrator.

DETAILED DESCRIPTION OF PREFERRED EMBODIMENTS (First Exemplary Embodiment)

Figure 1:
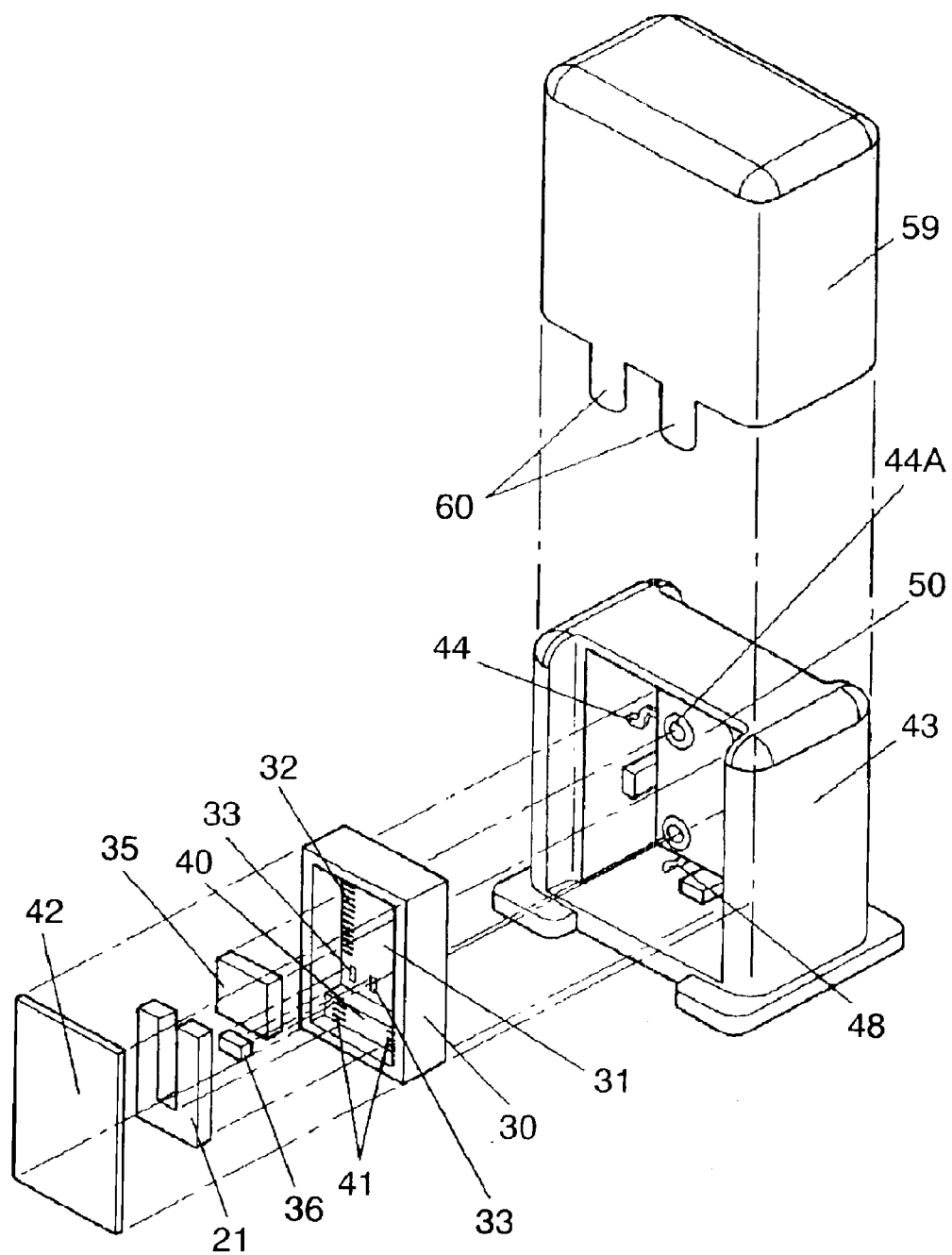
FIG. 1 is an exploded view in perspective of an angular velocity sensor of a first exemplary embodiment of the present invention.
Figure 2:
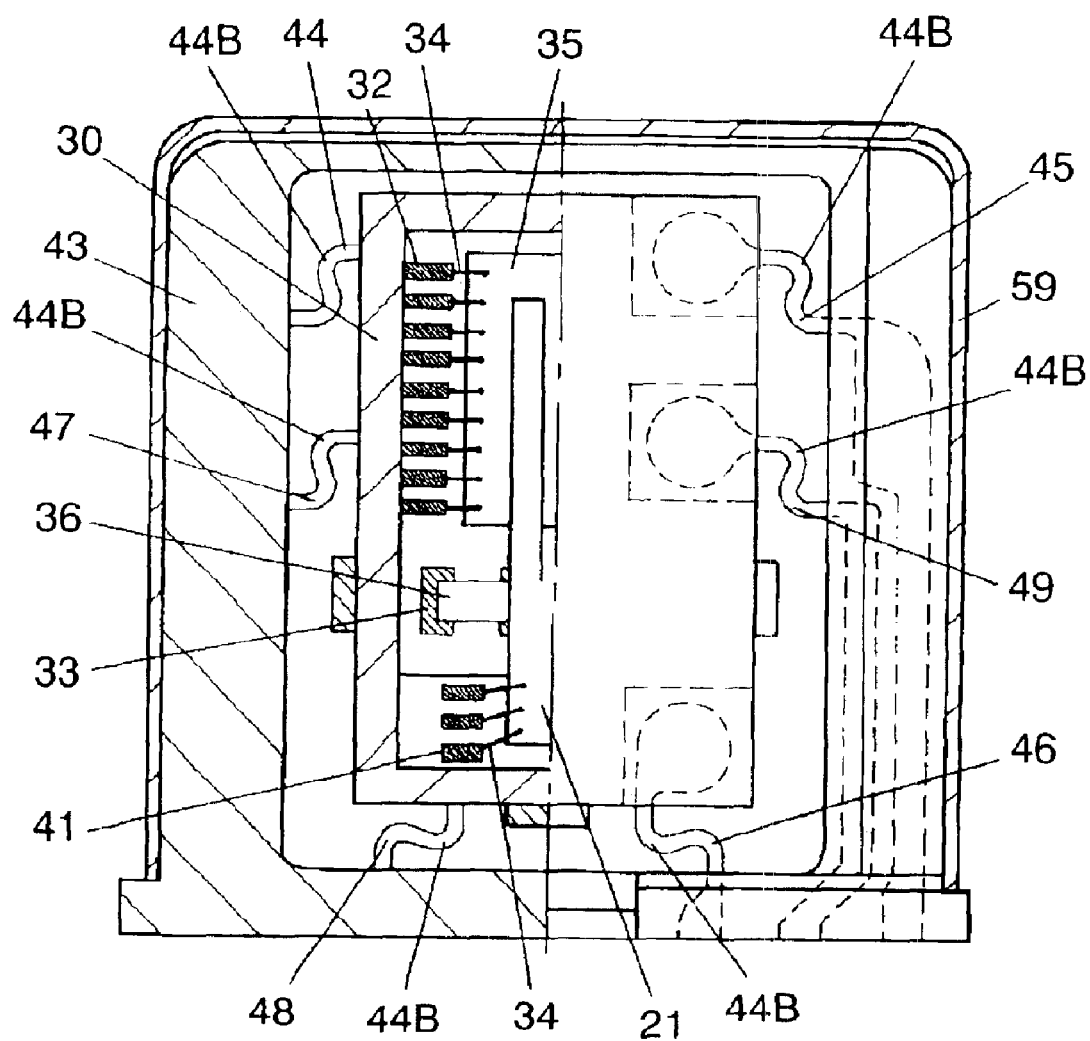
FIG. 2 is a lateral sectional view of the angular velocity sensor of the first exemplary embodiment of the invention.
Figure 3:
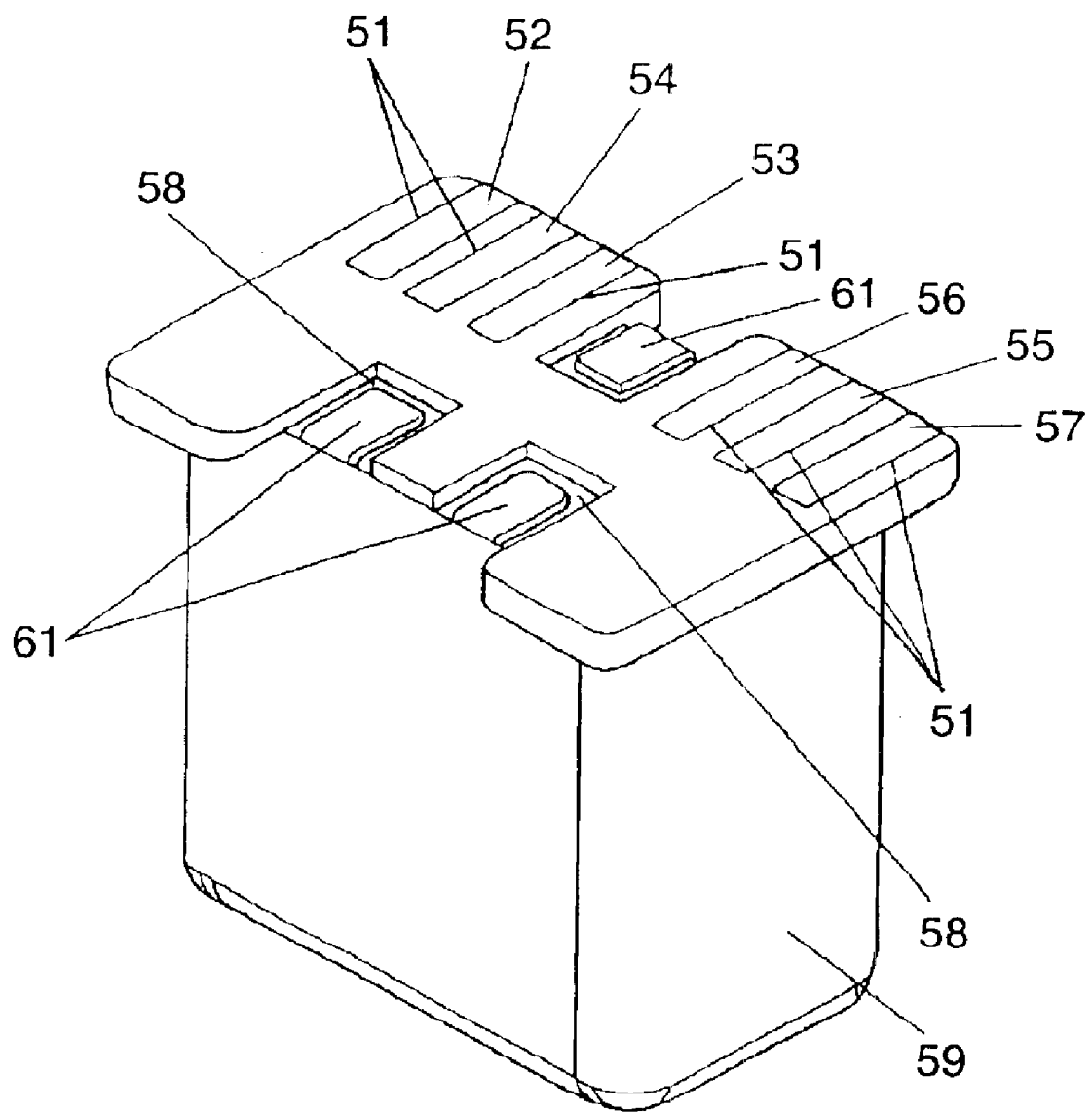
FIG. 3 is a perspective view seen from the rear side of the angular velocity sensor of the first exemplary embodiment of the invention.
Figure 4:
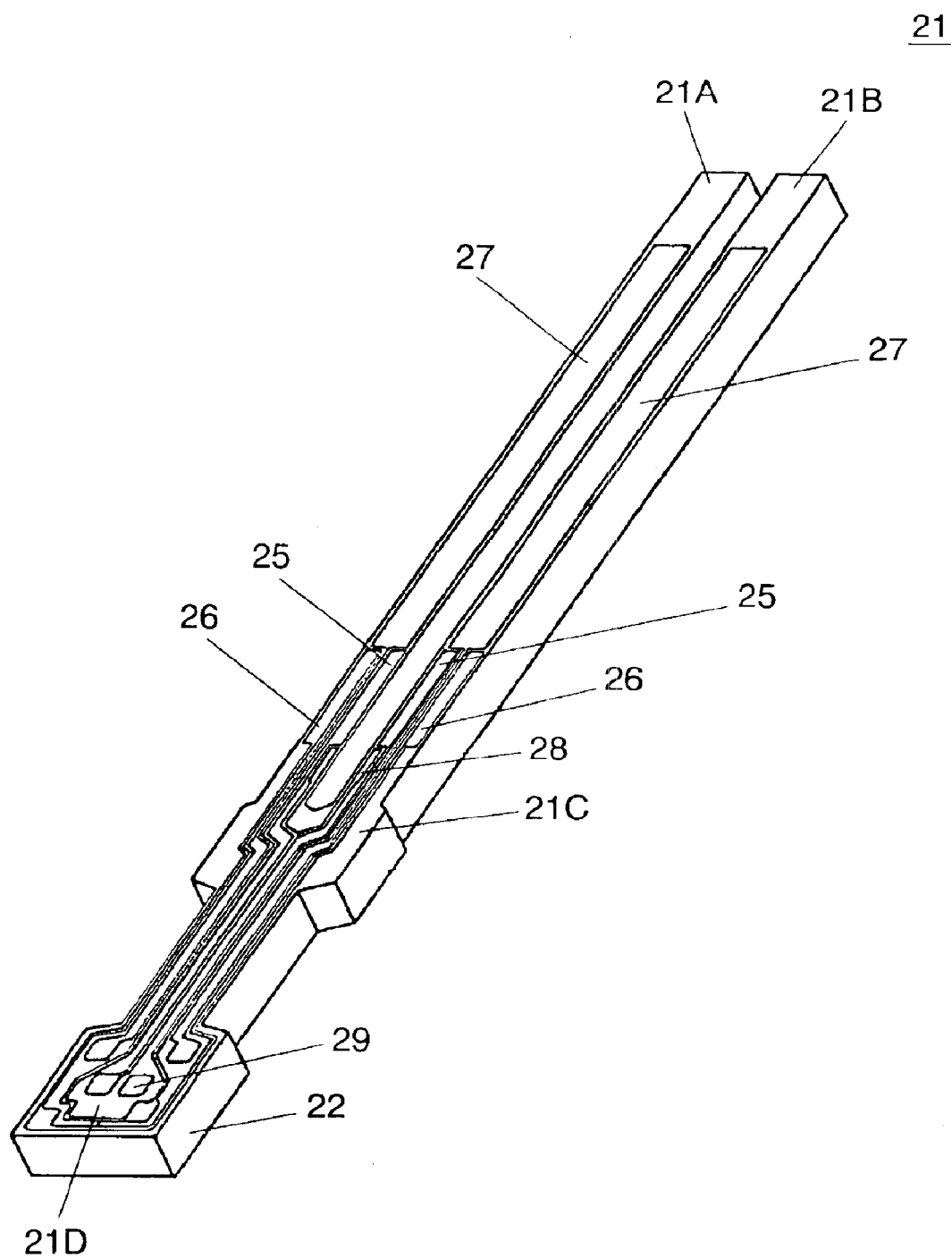
FIG. 4 is a perspective view of a vibrator in the angular velocity sensor of the first exemplary embodiment of the invention.
Figure 5:
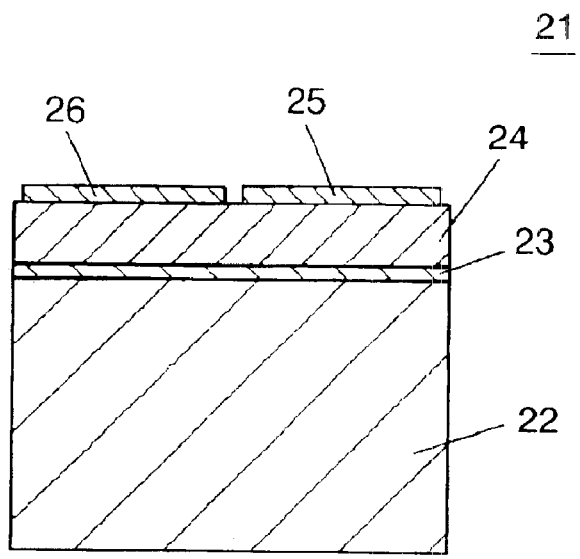
FIG. 5 is a sectional view of a first arm portion of the vibrator of the angular velocity sensor of the first exemplary embodiment of the invention.
Figure 6:
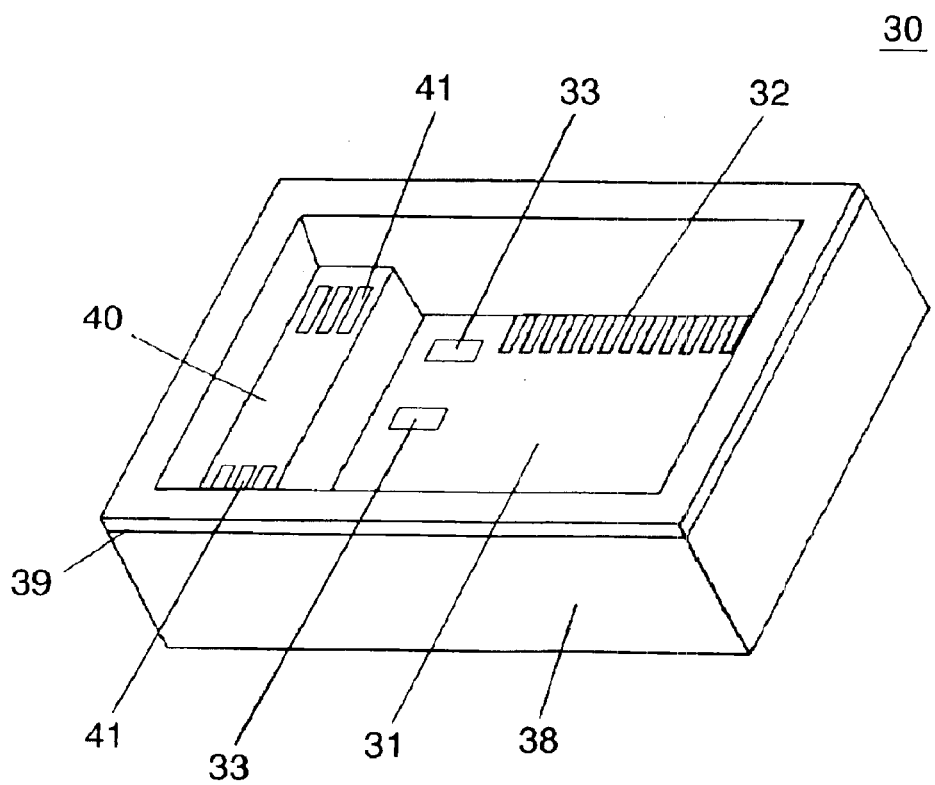
FIG. 6 is a perspective view of a case in the angular velocity sensor of the first exemplary embodiment of the invention.
Figure 7:
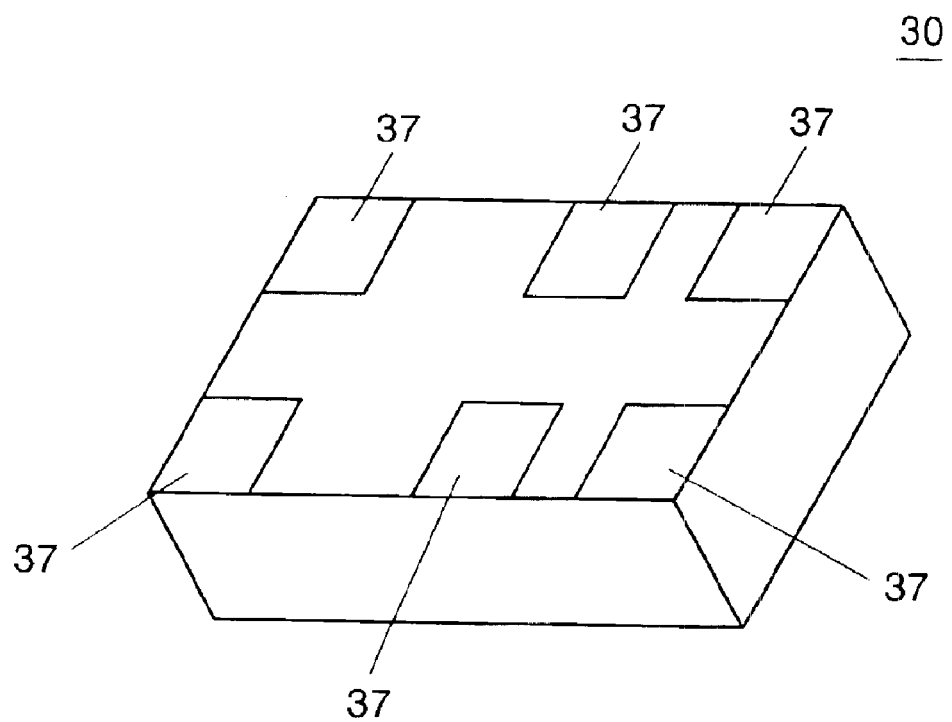
FIG. 7 is a perspective view seen from the rear side of the case in the angular velocity sensor of the first exemplary embodiment of the invention.
Figure 8:
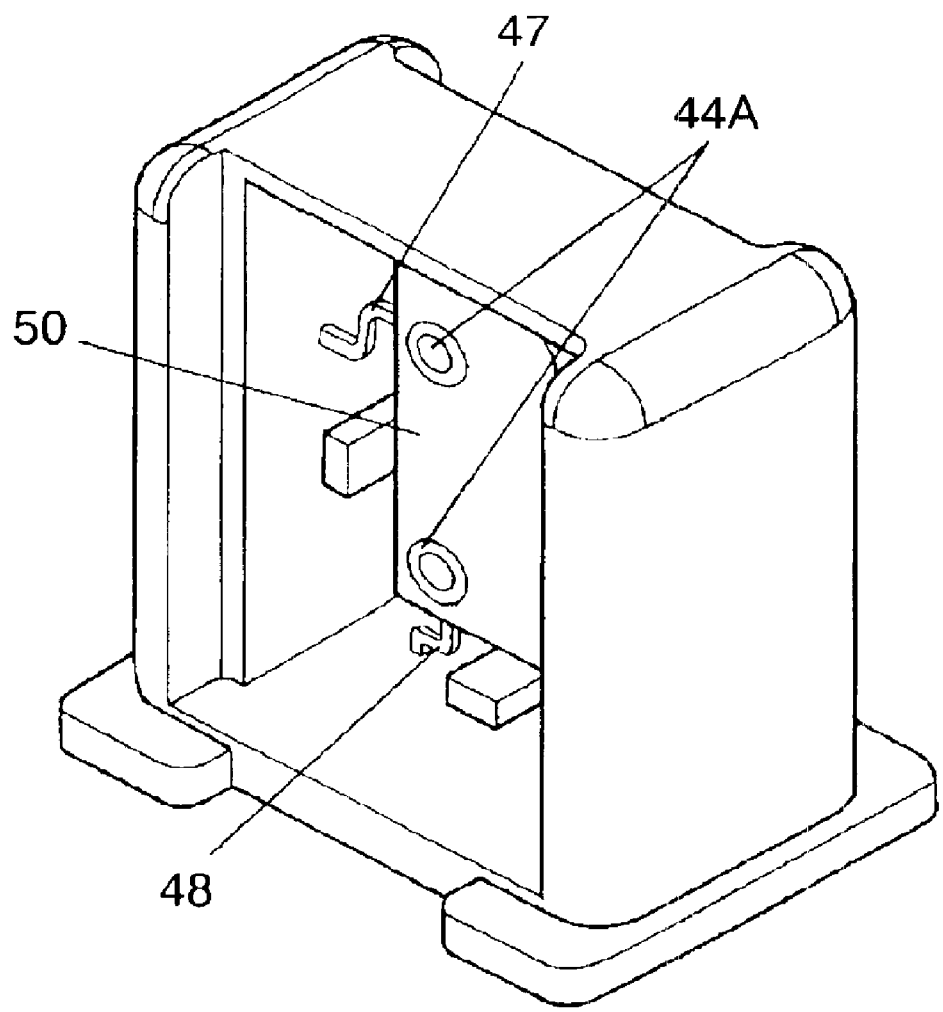
FIG. 8 is a perspective view of a containing portion in the angular velocity sensor of the first exemplary embodiment of the invention.
Figure 9:
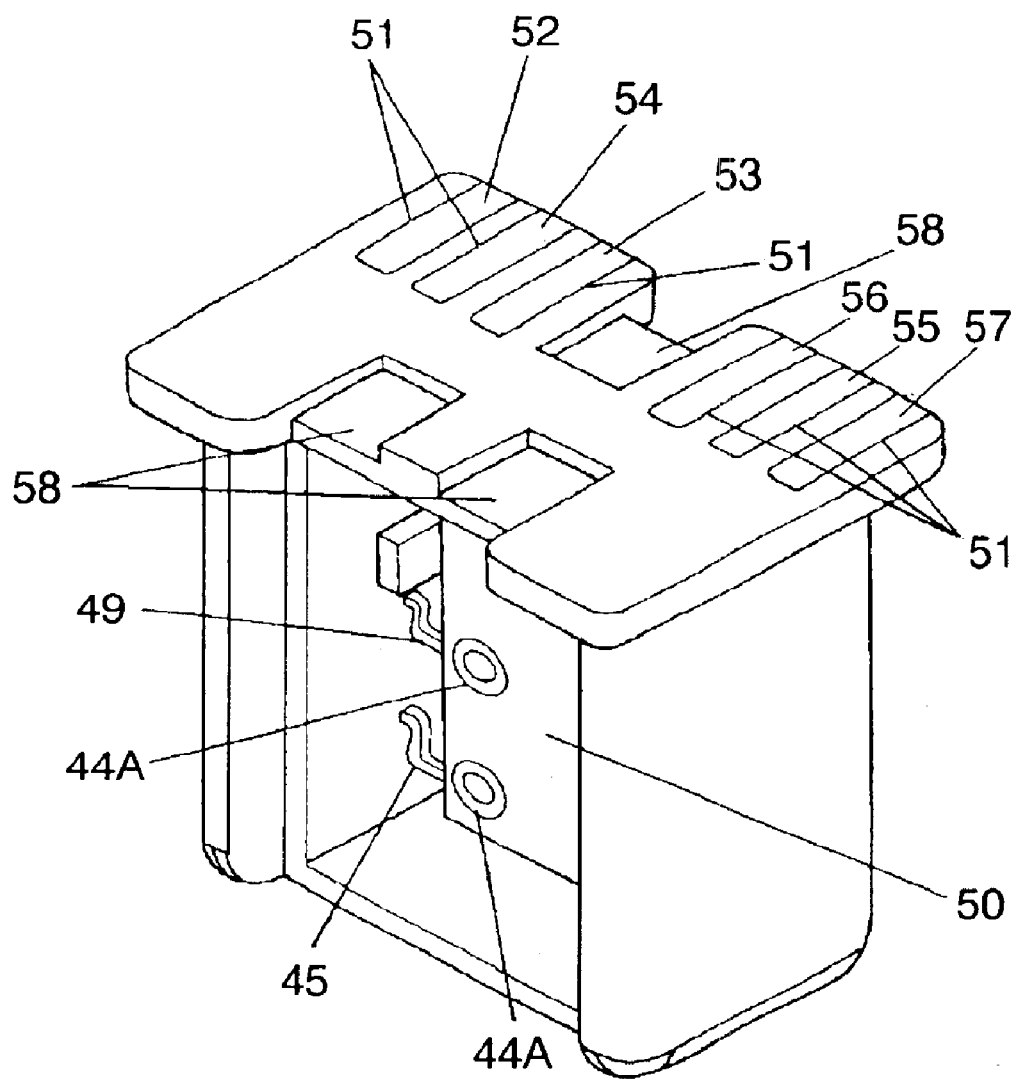
FIG. 9 is a perspective view seen from an underside of the containing portion in the angular velocity sensor of the first exemplary embodiment of the invention.

FIG. 1 is an exploded view in perspective of an angular velocity sensor of the first exemplary embodiment of the present invention, FIG. 2 is a lateral sectional view of the angular velocity sensor, and FIG. 3 is a perspective view seen from the rear side of the angular velocity sensor. FIG. 4 is a perspective view of a vibrator in the angular velocity sensor and FIG. 5 is a sectional view of a first arm portion of the vibrator. FIG. 6 is a perspective view of a case of the angular velocity sensor and FIG. 7 is a perspective view of the case seen from the rear side. FIG. 8 is a perspective view of a containing portion of the angular velocity sensor and FIG. 9 is a perspective view of the containing portion seen from the underside.

In FIG. 1 to FIG. 9, vibrator 21 in a tuning-fork shape is composed, as shown in FIG. 4, of first arm portion 21A, second-arm portion 21B, joint portion 21C where end portions of first arm portion 21A and second arm portion 21B are joined together, and fixed portion 21D provided spaced apart from joint portion 21C. Further, as shown in FIG. 5, vibrator 21 has common GND electrode 23 of an alloy thin film of platinum (Pt) and titanium (Ti) disposed all over the upper side of substrate 22 made of silicon (Si). Further, on the upper side of common GND electrode 23, there is provided piezoelectric layer 24 made of a thin film of lead zirconate titanate (PZT). Further, as shown in FIG. 4, vibrator 21 has a pair of first driving electrodes 25 disposed around the center and on the inner side of the top face of piezoelectric layer 24. Further, vibrator 21 has a pair of second driving electrodes 26 disposed around the center and on the outer side of the top face of piezoelectric layer 24. Further, vibrator 21 has a pair of detecting electrodes 27 disposed on the side toward the front end of the top face of piezoelectric layer 24, while it has monitor electrode 28 disposed on the side closer to the base end than first driving electrode 25 of the top face of piezoelectric layer 24. Further, fixed portion 21D of vibrator 21 is provided with GND electrode 29 on the surface of piezoelectric layer 24.

Ceramic case 30 has multilayer board 31, having a layer structure formed of ceramic material and wiring conductors, provided all the way from its inner bottom face to its outer bottom face. On the top face of multilayer board 31, there are disposed first wiring electrodes 32 and second wiring electrodes 33 as shown in FIG. 6. On the top face of multilayer board 31, IC 35 is electrically connected with first wiring electrodes 32 via wires 34 made of gold (Au) or aluminum. Capacitor 36 is electrically connected with second wiring electrodes 33. IC 35 constitutes a circuit for processing an output signal output from detecting electrodes 27 of vibrator 21. IC 35 is received within case 30. Further, as shown in FIG. 7, the outer bottom face of multilayer circuit board 31, constituting a bottom portion of case 30, has six case electrodes 37 made of silver. Further, as shown in FIG. 6, case 30 is provided with ceramic side walls 38 formed along the circumference of the top face of multilayer circuit board 31 and, on the top face of side walls 38, there is provided metallic frame 39 made of a kovar alloy.

Further, on the inner bottom face of case 30, there is provided a stepped portion 40 as shown in FIG. 6 and stepped portion 40 is adapted to be fixed with fixed portion 21D of vibrator 21 shown in FIG. 4. On both sides of stepped portion 40 to which fixed portion 21D is fixed, there are provided third wiring electrodes 41. Third wiring electrodes 41 are electrically connected with first driving electrodes 25, second driving electrodes 26, detecting electrodes 27, monitor electrode 28, and GND electrode 29 of vibrator 21 via wires 34. In the described configuration, vibrator 21 has fixed portion 21D not affecting vibrations and fixed portion 21D is fixed to stepped portion 40 of case 30. Hence, even if vibrator 21 is reduced in size, fixed portion 21D is not reduced in size, contrary to the case of conventional angular velocity sensors. Therefore, vibrator 21 is securely fixed to case 30.

The interior of case 30 is filled with nitrogen and the opening of case 30 is sealed up by metallic lid 42. Containing portion 43 made of a resin material is configured such that a detecting axis of angular velocity is oriented perpendicular to a substrate on the opposite side (not shown), the angular velocity thereof being under measurement. Containing portion 43 contains case 30. In containing portion 43, there are embedded, as shown in FIG. 2, first ends of power supply terminal 44, output terminal 45, GND terminal 46, first adjustment terminal 47, second adjustment terminal 48, and adjusting GND terminal 49. Here, power supply terminal 44 is electrically connected with first driving electrodes 25 and second driving electrodes 26 of vibrator 21. Output terminal 45 is electrically connected with detecting electrodes 27. First adjustment terminal 47, second adjustment terminal 48, and adjusting GND terminal 49 are used for calibration at the time of assembling.

As shown in FIG. 1 and FIG. 8, mount portion 50 disposed substantially in the center of containing portion 43 and substantially parallel to the detecting axis of angular velocity in containing portion 43 has case 30 mounted thereon. In mount portion 50, there are embedded the second ends of power supply terminal 44, output terminal 45, GND terminal 46, first adjustment terminal 47, second adjustment terminal 48, and adjusting GND terminal 49. Front end portions 44A of those terminals are exposed on mount portion 50. In FIG. 8, there are typically shown front end portions 44A of terminal 47 and terminal 48. Further, as shown in FIG. 2, GND terminal 46 and second adjustment terminal 48 are oriented parallel to the detecting axis of angular velocity in mounting portion 50. Power supply terminal 44, output terminal 45, first adjustment terminal 47, and adjustment GND terminal 49 are disposed on both sides of mount portion 50 and oriented vertical to the detecting axis of angular velocity.

By virtue of the described configuration, the center axis of the detected angular velocity is secured by GND terminal 46 and second adjustment terminal 48 oriented parallel to the detecting axis of angular velocity. Further, movement of the case in the direction of the angular velocity due to small vibrations is prevented by power supply terminal 44, output terminal 45, first adjustment terminal 47, and adjustment GND terminal 49 oriented perpendicular to the detecting axis of angular velocity. Thereby, displacement of case 30 in the direction of the angular velocity while no angular velocity is applied to the angular velocity sensor is prevented and, hence, the output characteristic of the angular velocity sensor is improved.

Further, mount portion 50 is located substantially in the center of containing portion 43 and oriented substantially parallel to the detecting axis of angular velocity in containing portion 43. Therefore, case 30 and vibrator 21 received within case 30 are disposed not to be tilting with respect to the detecting axis in containing portion 43. Thereby, the vector of the angular velocity applying to vibrator 21 is increased and, hence, no loss of the output characteristic is produced.

Case 30 is mounted on mount portion 50 within containing portion 43. Case electrodes 37 on case 30 are electrically connected with front end portions 44A of terminals 44, 45, 46, 47, 48, and 49 on mount portion 50. Since front end portions 44A are also connected mechanically with case 30, case 30 is supported by surrounding terminals 44, 45, 46, 47, 48, and 49. Namely, while vibrator 21 is received within case 30, case 30 is supported by terminals 44, 45, 46, 47, 48, and 49 from surrounding positions. Therefore, vibrator 21 can be reduced in size and, further, even if strong vibrations are externally applied to terminals 44, 45, 46, 47, 48, and 49, vibrator 21 can be securely supported by means of case 30. Thus, strength for holding vibrator 21 is secured and the output characteristic of the angular velocity sensor is kept from deteriorating. Even if the case is held by a single terminal, the effects both to reduce the size of the angular velocity sensor and to securely hold the vibrator can be obtained. However, it is preferred that a plurality of terminals be disposed around the case as described above and, further, their supports from surrounding positions be given in both directions parallel to and perpendicular to the detecting axis of angular velocity.

Further, on the outer bottom face of containing portion 43, there are provided six recesses-for-electrodes 51 as shown in FIG. 3. And, front end portions of terminals 44, 45, 46, 47, 48, and 49 that are embedded in containing portion 43 are exposed from recesses-for-electrodes 51. Thereby, power supply electrode 52, GND electrode 53, output electrode 54, first adjustment electrode 55, second adjustment electrode 56, and adjusting GND electrode 57 are provided. Therefore, it is not necessary to provide electrodes 52, 53, 54, 55, 56, and 57 separately from terminals 44, 45, 46, 47, 48, and 49. Further, it is not necessary to electrically connect terminals 44, 45, 46, 47, 48, and 49 with electrodes 52, 53, 54, 55, 56, and 57 by such means as soldering. Thus, the parts count can be decreased and electrodes 52, 53, 54, 55, 56, and 57 can be provided with ease. Further, as shown in FIG. 7, case electrodes 37 are disposed on the rear face of case 30. And, front end portions 44A on second end sides of power supply terminal 44, output terminal 45, GND terminal 46, first adjustment terminal 47, second adjustment terminal 48, and adjusting GND terminal 49 are exposed on mount portion 50. Further, it is adapted such that case electrodes 37 are electrically connected with front end portions on one end sides 44A of terminals 44, 45, 46, 47, 48, and 49 by mounting case 30 on mount portion 50. After having mount portion 50 mounted on case 30, front end portions 44A on one end sides of terminals 44, 45, 46, 47, 48, and 49 are soldered with case electrodes 37. Only by taking such means, power supply terminal 44 can be connected with first driving electrode 25 and second driving electrode 26 of vibrator 21, while output terminal 45 can be electrically connected with detecting electrodes 27. Thus, an angular velocity sensor with assembling workability thereof enhanced can be provided.

Further, as shown in FIG. 2, each of terminals 44, 45, 46, 47, 48, and 49 is provided with Z-shaped bent portion 44B substantially in the center thereof. By means of bent portions 44B, case 30 is adapted to be displaced relative to containing portion 43. Accordingly, when an external vibration is propagated through terminals 44, 45, 46, 47, 48, and 49 to be transmitted to vibrator 21, case 30 displaces relative to containing portion 43. Thereby, vibration energy is consumed and the vibration transmitted to vibrator 21 is attenuated. As a result, occurrence of an error output signal from detecting electrodes 27 of vibrator 21 due to such a vibration is reduced and, hence, the output characteristic of the angular velocity sensor is stabilized.

Further, on the outer bottom face of containing portion 43, there are provided three recesses 58 as shown in FIG. 9. Metallic cover 59 is provided with three engagement lugs or claws 60 on its opening side as shown in FIG. 1 so as to be fixed in place by having engagement lugs 60 bent into recesses 58 provided on containing portion 43 as shown in FIG. 3. Further, GND potential connection portions 61 are provided on the outer bottom face of containing portion 43 as shown in FIG. 3. By virtue of such a configuration, GND potential connection portions 61 can be electrically connected with GND on a circuit board on the opposite side (not shown) only by mounting the outer bottom face of containing portion 43 of the angular velocity sensor on the circuit board on the opposite side (not shown). As a consequence, metallic cover 59 is brought to the GND potential. Therefore, cover 59 serves as an electromagnetic wave shield and, thus, detecting electrodes 27 of vibrator 21 and IC 35 can be shielded from external electromagnetic waves and hence the output signal of the angular velocity sensor can be stabilized.

An assembling method of the angular velocity sensor of the first exemplary embodiment configured as above will be described below.

First, a method of fabricating vibrator 21 will be described with reference to FIG. 10A to FIG. 10F.

On the top face of prepared substrate 22 of Si, common GND electrode 23 made of a Pt—Ti alloy thin film is formed by evaporation. Then, on the top face of common GND electrode 23, piezoelectric layer 24 made of a PZT thin film is formed by evaporation.

Figure 10A:
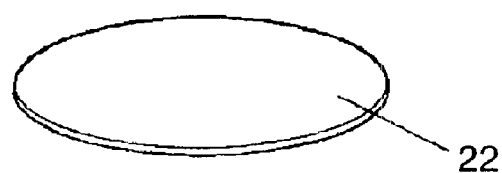
FIG. 10A to FIG. 10F are assembling process drawings of a vibrator in the angular velocity sensor of the first exemplary embodiment of the invention.
Figure 10B:
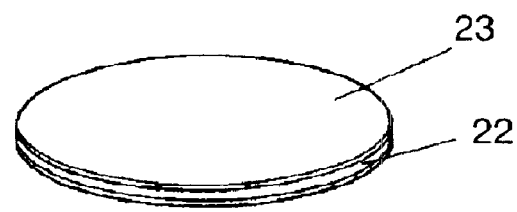
Figure 10C:
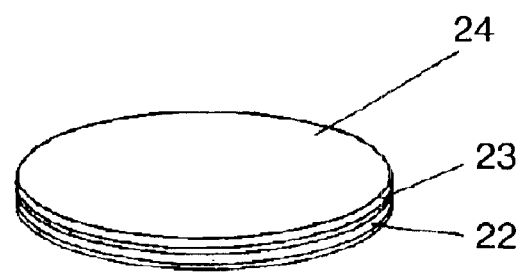
Figure 10D:
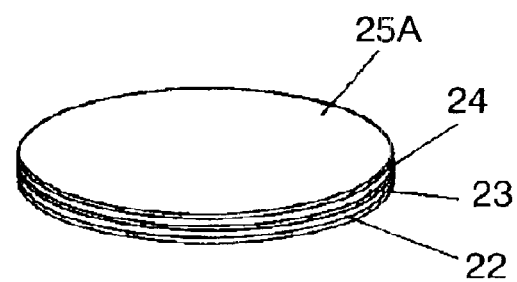
Figure 10E:

Then, on the top face of piezoelectric layer 24, in-process electrode 25A made of a Ti-Au alloy thin film is formed by evaporation. Then, unnecessary portions of common GND electrode 23, piezoelectric layer 24, and in-process electrode 25A are removed to thereby obtain a predetermined shape as shown in FIG. 10E. Thus, first driving electrodes 25, second driving electrodes 26, detecting electrodes 27, monitor electrode 28, and GND electrode 29 are formed on the top face of piezoelectric layer 24.

Then, piezoelectric layer 24 is polarized by applying a voltage to common GND electrode 23 while connecting to ground first driving electrodes 25, second driving electrodes 26, detecting electrodes 27, monitor electrode 28, and GND electrode 29.

Figure 10F:
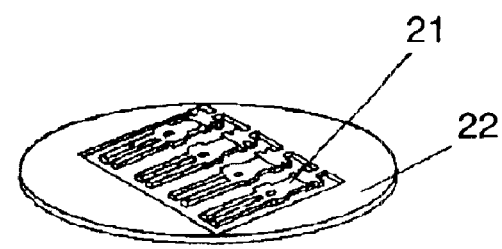

Then, by eliminating unnecessary portion of substrate 22, pieces of vibrators 21 as shown in FIG. 10F are provided.

Meanwhile, multilayer circuit board 31 made up of a ceramic insulator (not shown) and wiring conductors (not shown) and stepped portion 40 are prepared. On the top face of the same, first wring electrodes-32, second wiring electrodes 33, and third wiring electrodes 41 made of are formed. Then, case electrodes 37 made of Ag are formed on the bottom face of multilayer board 31 and, thereafter, ceramic side walls 38 are formed along the circumference of the top face of multilayer circuit board 31. Then, metallic frame 39 made of kovar is fixedly attached to the top face of side walls 38. Thus, case 30 is fabricated.

Then, IC 35 is mounted on the top face substantially in the center of multilayer circuit board 31 in case 30. Thereafter, electrodes (not shown) of IC 35 are electrically connected with first wiring electrodes 32 on multilayer circuit board 31 by wires 34 through wire bonding.

Then, capacitor 36 is connected by soldering to second wiring electrodes 33 on case 30.

Then, the underside of fixed portion 21D of vibrator 21 is fixedly attached to the upper face of stepped portion 40 of case 30. Thereafter, first driving electrodes 25, second driving electrodes 26, detecting electrodes 27, monitor electrode 28, and GND electrode 29 formed on the upper face of vibrator 21 are electrically connected with third wiring electrodes 41 on case 30 by wires 34 made of aluminum through wire bonding.

Then, metallic lid 42 is fixed to the opening portion of case 30 by seam welding in a nitrous atmosphere.

Figure 11A:
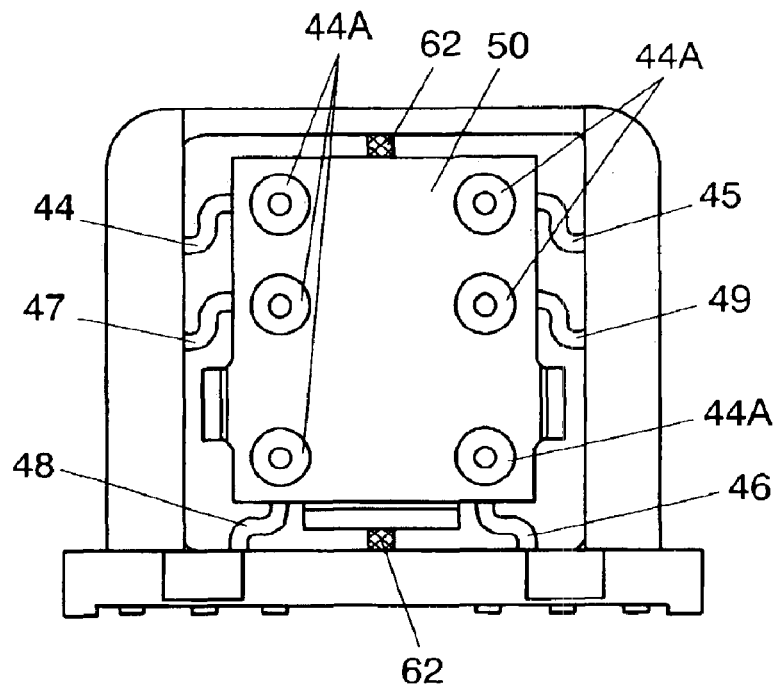
FIG. 11A and FIG. 11B are assembling process drawings showing a state where the containing portion is formed by heat shaping in the angular velocity sensor of the first exemplary embodiment of the invention.
Figure 11B:
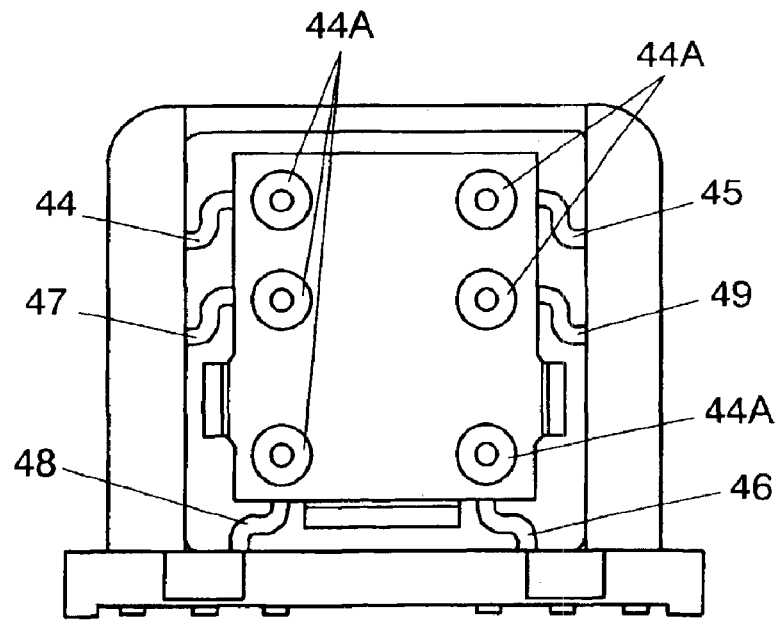

Then, power supply terminal 44, output terminal 45, GND terminal 46, first adjustment terminal 47, second adjustment terminal 48, and adjusting GND terminal 49 provided with bent portions 44B by being bent in advance are set up in a shaping mold (not shown). And, a molten resin is poured into the shaping mold (not shown) to thereby form mount portion 50. At this time, the second end sides of power supply terminal 44, output terminal 45, GND terminal 46, first adjustment terminal 47, second adjustment terminal 48, and adjusting GND terminal 49 are embedded in mount portion 50 as shown in FIG. 11A. Further, the embedding is made so that front end portions 44A of the second end sides of the terminals are exposed on mount portion 50. At the same time, containing portion 43 is formed via connection portions 62 provided within a through gate (not shown) in the shaping mold (not shown). At this time, the first end sides of terminals 44, 45, 46, 47, 48, and 49 are embedded in containing portion 43. Further, it is arranged such that the front end portions on the first end side of the terminals are protruded from the outer bottom face of containing portion 43. Further, recesses-for-electrode 51 and recesses 58 are formed in the outer bottom face of containing portion 43.

Then, as shown in FIG. 11A, connection portions 62 connecting containing portion 43 with mount portion 50 are removed so that the resin connection between containing portion 43 and mount portion 50' is broken.

In other words, mount portion 50 and containing portion 43 are formed of the same resin material so that mount portion 50 and containing portion 43 are produced by shaping at a time. Thereby, assembling man-hours of the angular velocity sensor can be reduced.

Then, case 30 is mounted on mount portion 50 and soldering is performed from the rear side of mount portion 50. Thereby, front end portions 44A of power supply terminal 44, output terminal 45, GND terminal 46, first adjustment terminal 47, second adjustment terminal 48, and adjusting GND terminal 49 are electrically connected with case electrodes 37 on case 30.

Figure 12:
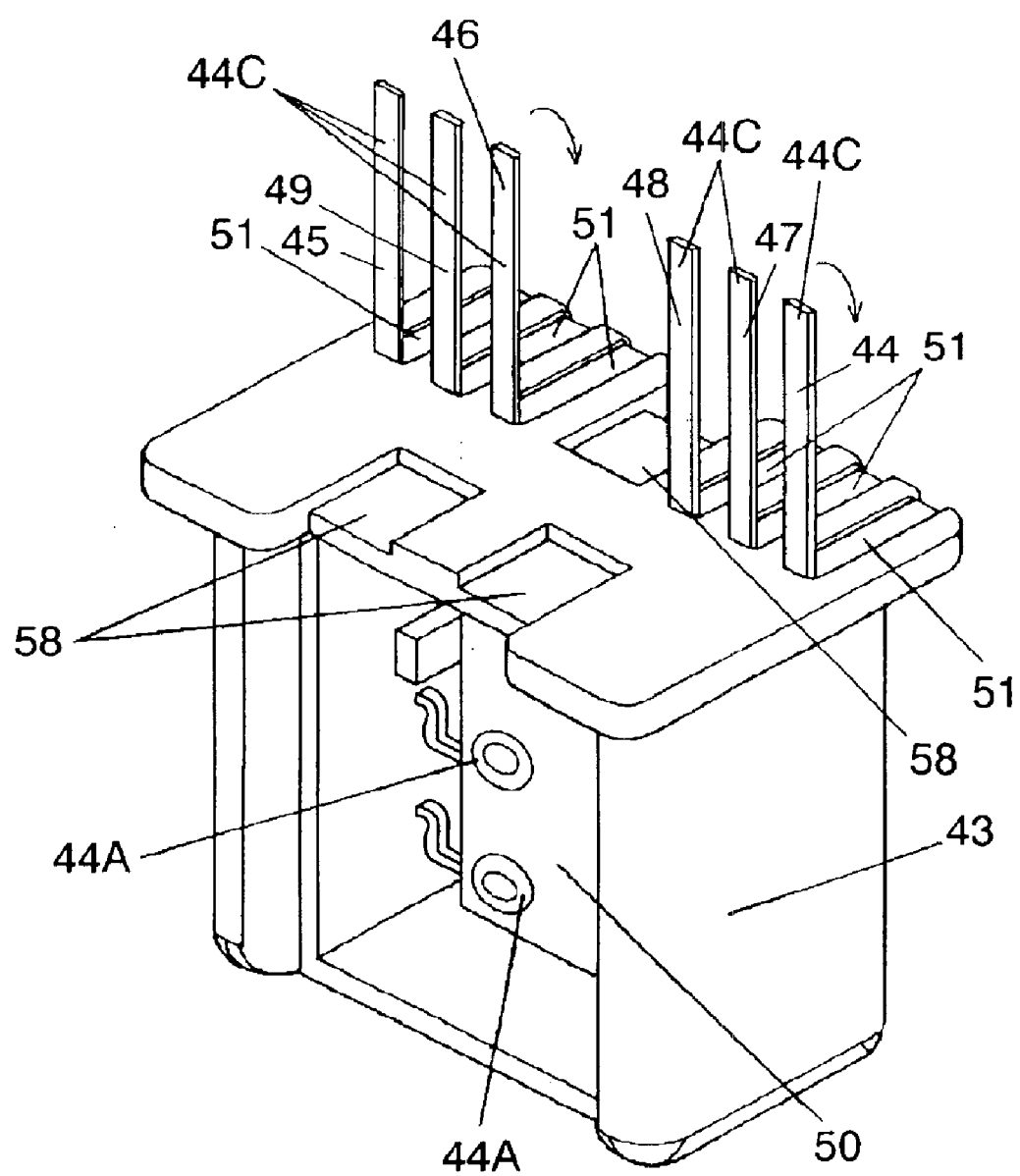
FIG. 12 is a perspective view showing a state of front end portions of terminals bent over the outer bottom face of the containing portion of the angular velocity sensor of the first exemplary embodiment of the invention.

Then, as shown in FIG. 12, front end portions 44C on the first end sides of terminals 44, 45, 46, 47, 48, and 49 are bent at the positions of recesses-for-electrodes 51 provided in the outer bottom face of containing portion 43. In the described way, power supply electrode 52, GND electrode 53, output electrode 54, first adjustment electrode 55, second adjustment electrode 56, and adjusting GND electrode 57 are formed on the outer bottom face of containing portion 43.

Finally, metallic cover 59 is placed over containing portion 43, and three engagement lugs 60 provided on the side of the opening of cover 59 are positioned at three recesses 58 provided on the outer bottom face of containing portion 43 and squeezed into the recesses to be secured therein. Thus, GND potential connection portions 61 are formed on the outer bottom face of containing portion 43.

Operation of the angular velocity sensor of the first exemplary embodiment of the present invention configured as above will be described below.

Figure 13:
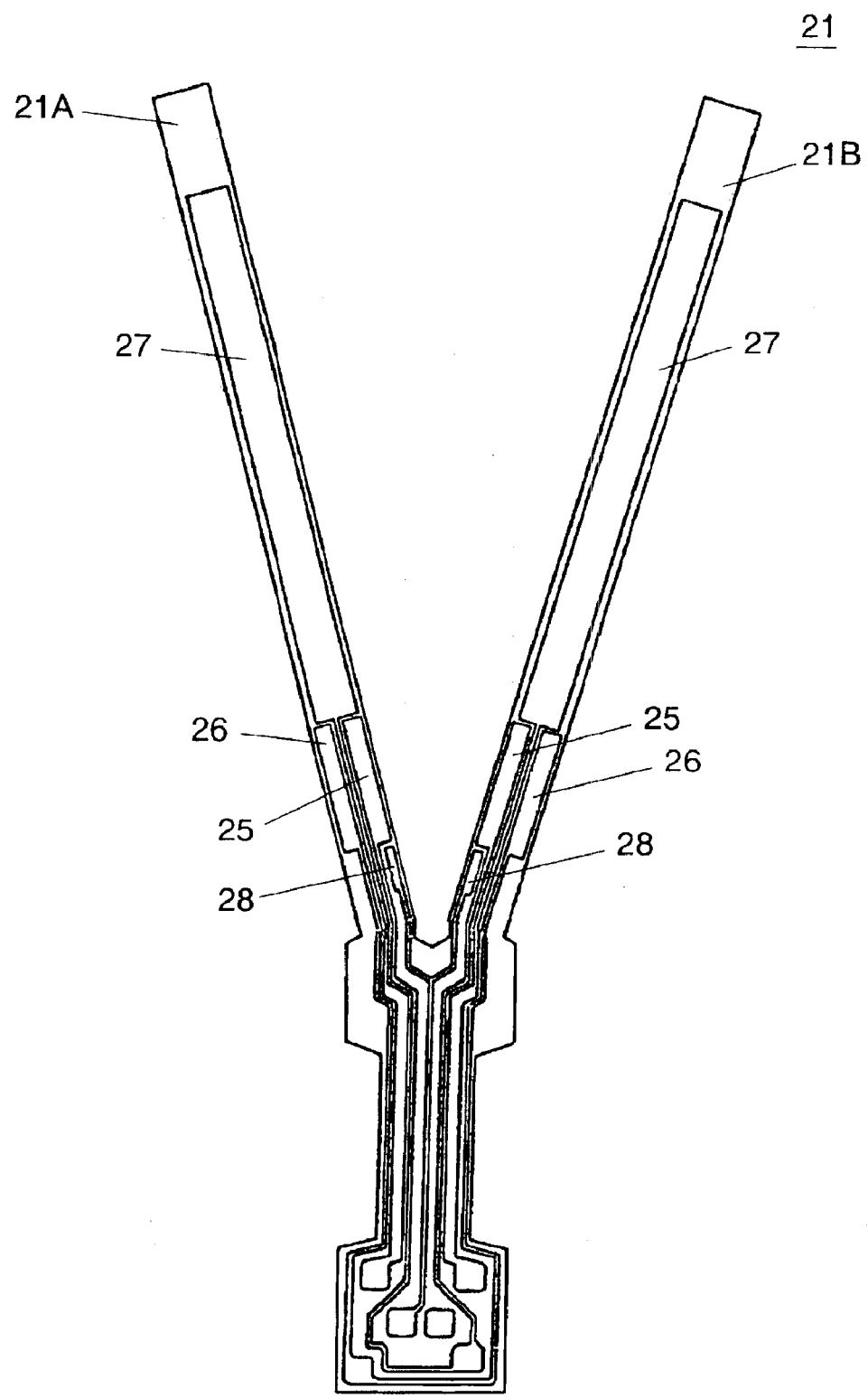
FIG. 13 and FIG. 14 are lateral views showing operating states of the vibrator in the angular velocity sensor of the first exemplary embodiment of the invention.

First, a positive voltage is applied to first driving electrode 25 provided on each of first arm portion 21A and second arm portion 21B of vibrator 21, while a negative voltage is applied to second driving electrode 26. Then, piezoelectric layer 24 positioned under first driving electrode 25 is expanded and piezoelectric layer 24 positioned under second driving electrode 26 is contracted. Accordingly, first arm portion 21A and second arm portion 21B open outwardly as shown in FIG. 13.

Figure 14:
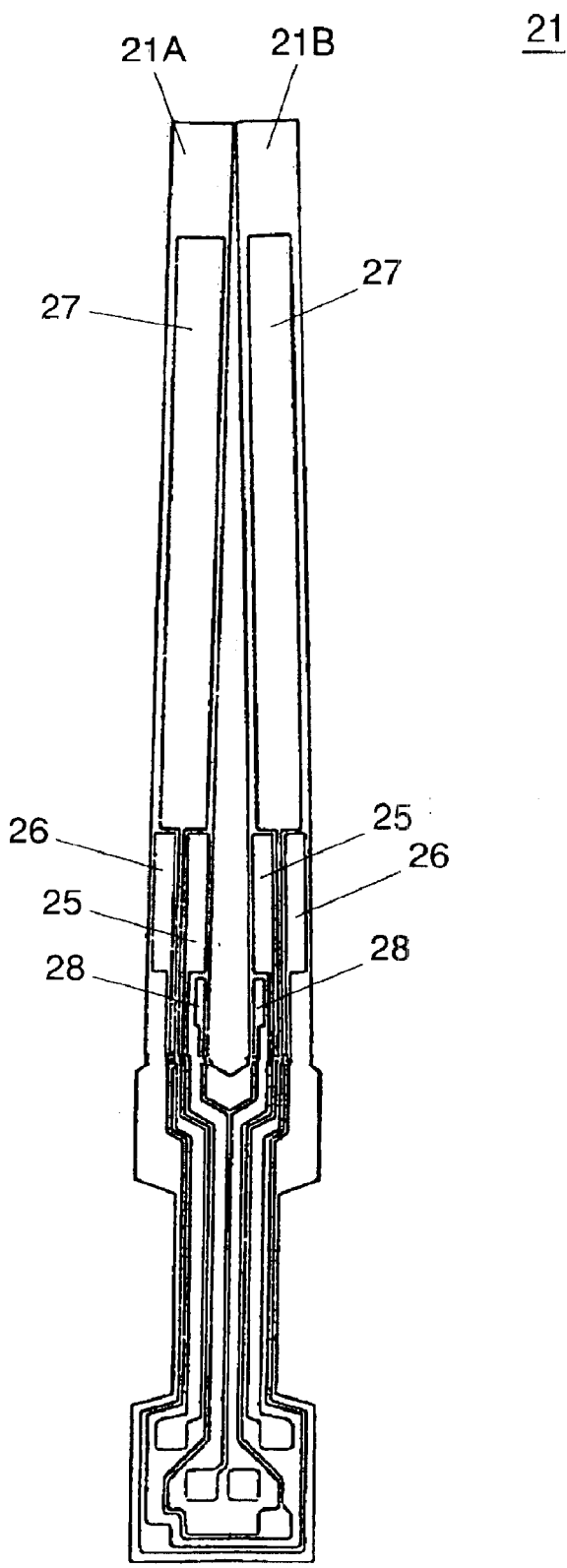

If, reversely, a negative voltage is applied to first driving electrode 25 and a positive voltage is applied to second driving electrode 26, then piezoelectric layer 24 positioned under first driving electrode 25 is contracted and piezoelectric layer 24 positioned under second driving electrode 26 is expanded. Accordingly, first arm portion 21A and second arm portion 21B close inwardly as shown in FIG. 14. In other words, if an AC voltage is applied to first driving electrodes 25 and second driving electrodes 26, first arm portion 21A and second arm portion 21B make bending operation at velocity V at the natural frequency in the planar direction. In such bending operation of vibrator 21, the voltage applied to first driving electrodes 25 and second driving electrodes 26 is adjusted such that the output signal generated from monitor electrode 28 becomes constant and, thereby, the amplitude of the bending operation is controlled.

In a state where arm portion 21A and arm portion 21B are making bending operation at the natural frequency, if vibrator 21 is rotated at angular velocity a around the center axis in the longitudinal direction (detecting axis), then Coriolis force is applied to arm portion 21A and arm portion 21B. Its magnitude is F=2 mVω, where m is the mass of each arm. An output signal resulting from electric charges generated on piezoelectric layer 24 located under detecting electrodes 27 due to the Coriolis force is input to IC 35. At this time, the signal is input to IC 35 by way of detecting electrodes 27, wire 34, third wiring electrodes 41, multilayer circuit board 31, first wiring electrodes 32 and wire 34. The signal, after being subjected to waveform processing in IC 35, is input, by way of second wiring electrodes 33, capacitor 36, case electrodes 37, front end portion 44A of output terminal 45, output terminal 45, and output electrode 54, to a computer on the opposite side (not shown). Thereby, the angular velocity is detected.

When an unwanted vibration is externally transmitted to the angular velocity sensor, natural frequency f of the vibrating matter is expressed as equation (1). Such a vibration is transmitted through power supply terminal 44, output terminal 45, GND terminal 46, first adjustment terminal 47, second adjustment terminal 48, and adjusting GND terminal 49.

$$f = \frac{1}{2 \times \pi} \sqrt{\frac{K}{M}}, \tag{1}$$

where K is the vector sum of the spring constants of the terminals, while M is the total sum of mass of the terminals and the matters supported by the terminals.

Figure 15:
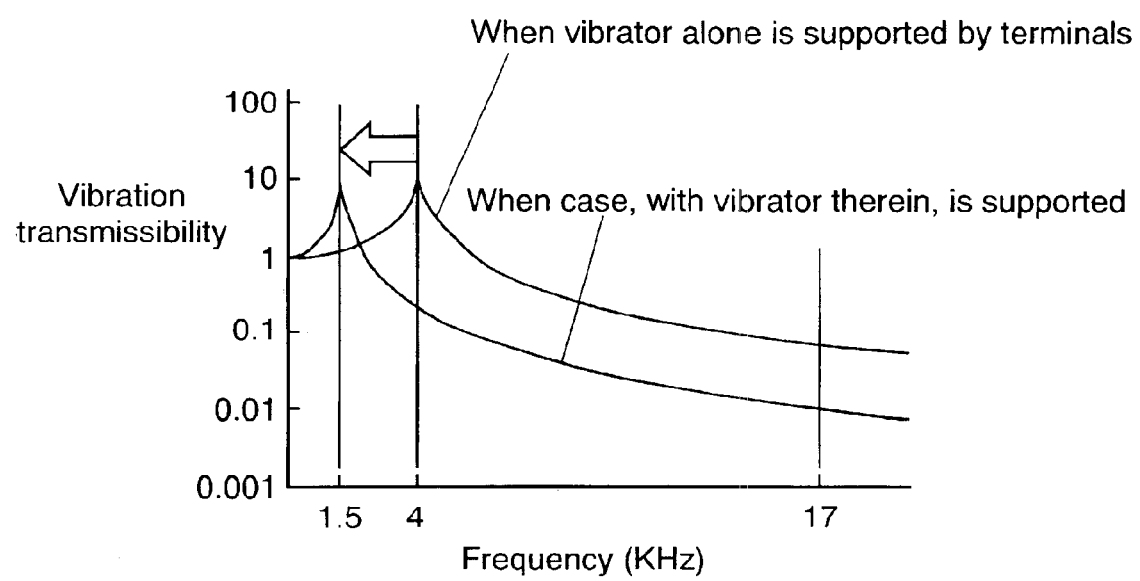
FIG. 15 is a characteristic diagram showing a transfer characteristic of vibration of the vibrator in the angular velocity sensor of the first exemplary embodiment of the invention.

When vibrator 21 alone is supported by power supply terminal 44, output terminal 45, GND terminal 46, first adjustment terminal 47, second adjustment terminal 48, and adjusting GND terminal 49, then, the natural frequency of the structure of vibrator 21 coupled with those terminals is approximately 4 KHz. In the case of the angular velocity sensor of the first exemplary embodiment of the present invention, case 30 with vibrator 21 received therein is supported by surrounding terminals 44, 45, 46, 47, 48, and 49. The natural frequency of such a structure is approximately 1.5 KHz. When case 30 with vibrator 21 received therein is supported by terminals 44, 45, 46, 47, 48, and 49, from surrounding positions, the vibration transmissibility around a natural frequency of 17 KHz of vibrator 21 becomes approximately 0.01 as shown in FIG. 15. This value is approximately 1/6 as compared with a vibration transmissibility of 0.06 in the case where vibrator 21 alone is supported by terminals 44, 45, 46, 47, 48, and 49. Consequently, unwanted external vibrations become hardly transmitted to vibrator 21 and, hence, the output characteristic of the angular velocity sensor is hardly deteriorated.

In the first exemplary embodiment, containing portion 43 having the first ends of terminals 44, 45, 46, 47, 48, and 49 embedded therein is made of a resin. Therefore, when external vibrations tend to be transmitted to vibrator 21 via terminals 44, 45, 46, 47, 48, and 49, vibration energy is converted into thermal energy by the resin material constituting containing portion 43. Hence, the vibrations transmitted through terminals 44, 45, 46, 47, 48, and 49 are attenuated. Thus, generation of an error output signal from detecting electrodes 27 due to abnormal vibrations of vibrator 21 caused by external vibrations can be further lessened and the output characteristic of the angular velocity sensor becomes more stable.

(Second Exemplary Embodiment)

Figure 16:
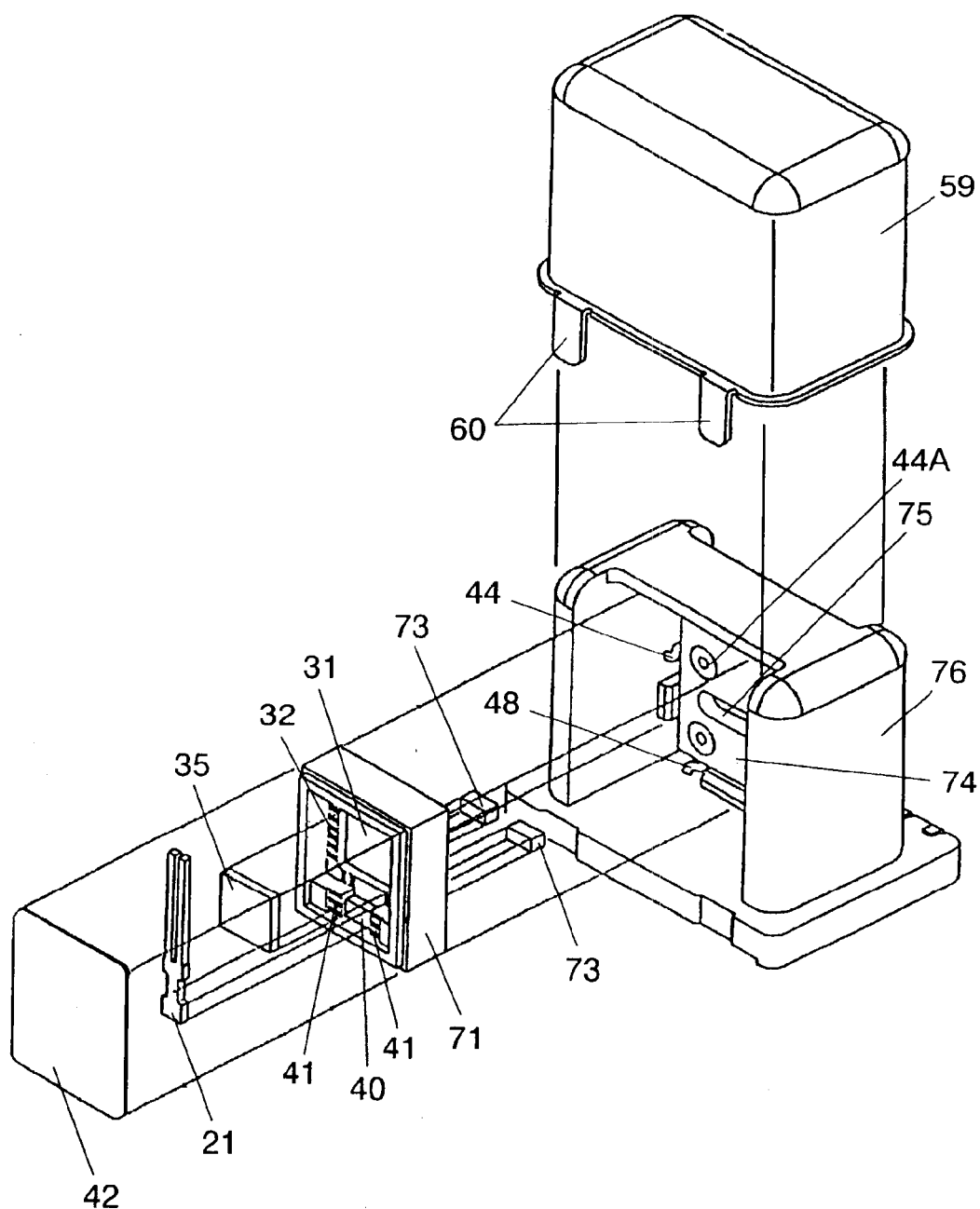
FIG. 16 is an exploded view in perspective of an angular velocity sensor of a second exemplary embodiment of the present invention.
Figure 17:
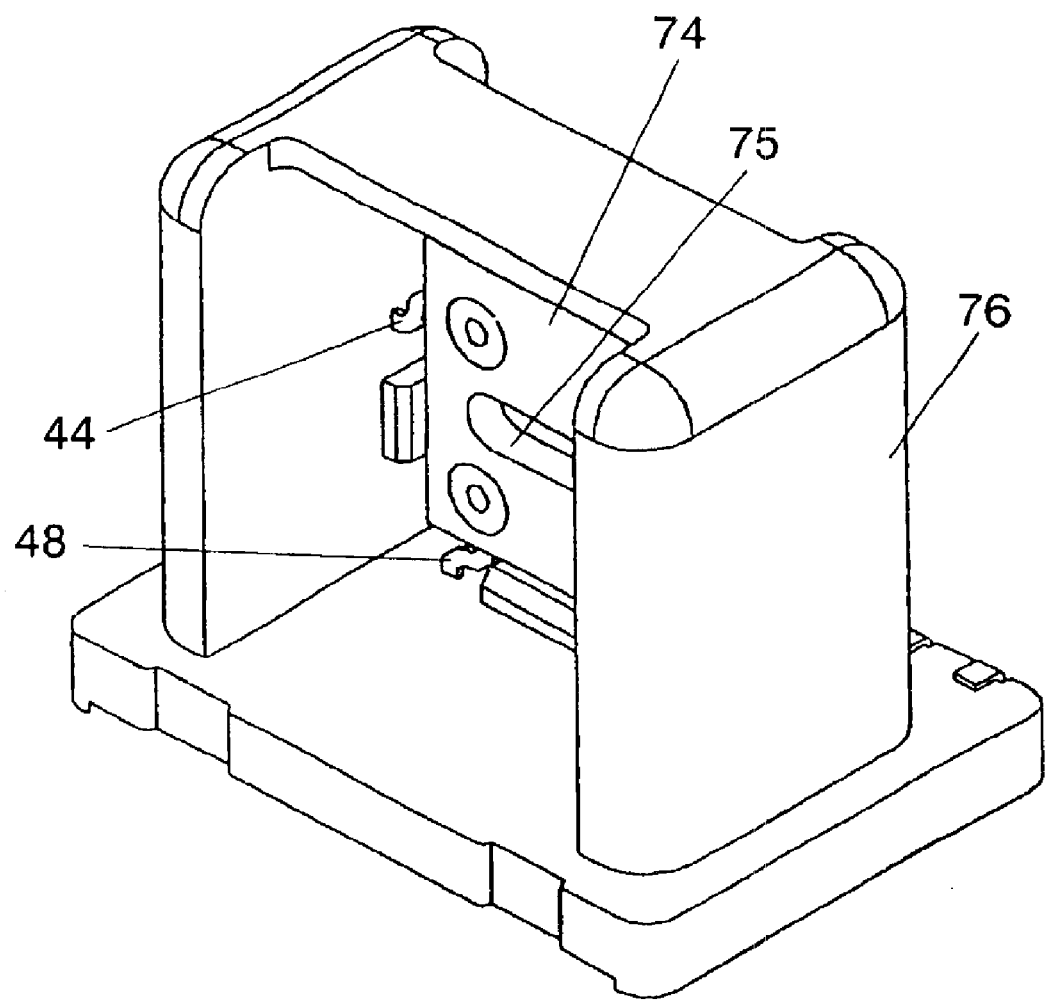
FIG. 17 is a perspective view of a containing portion in the angular velocity sensor of the second exemplary embodiment of the invention.
Figure 18:
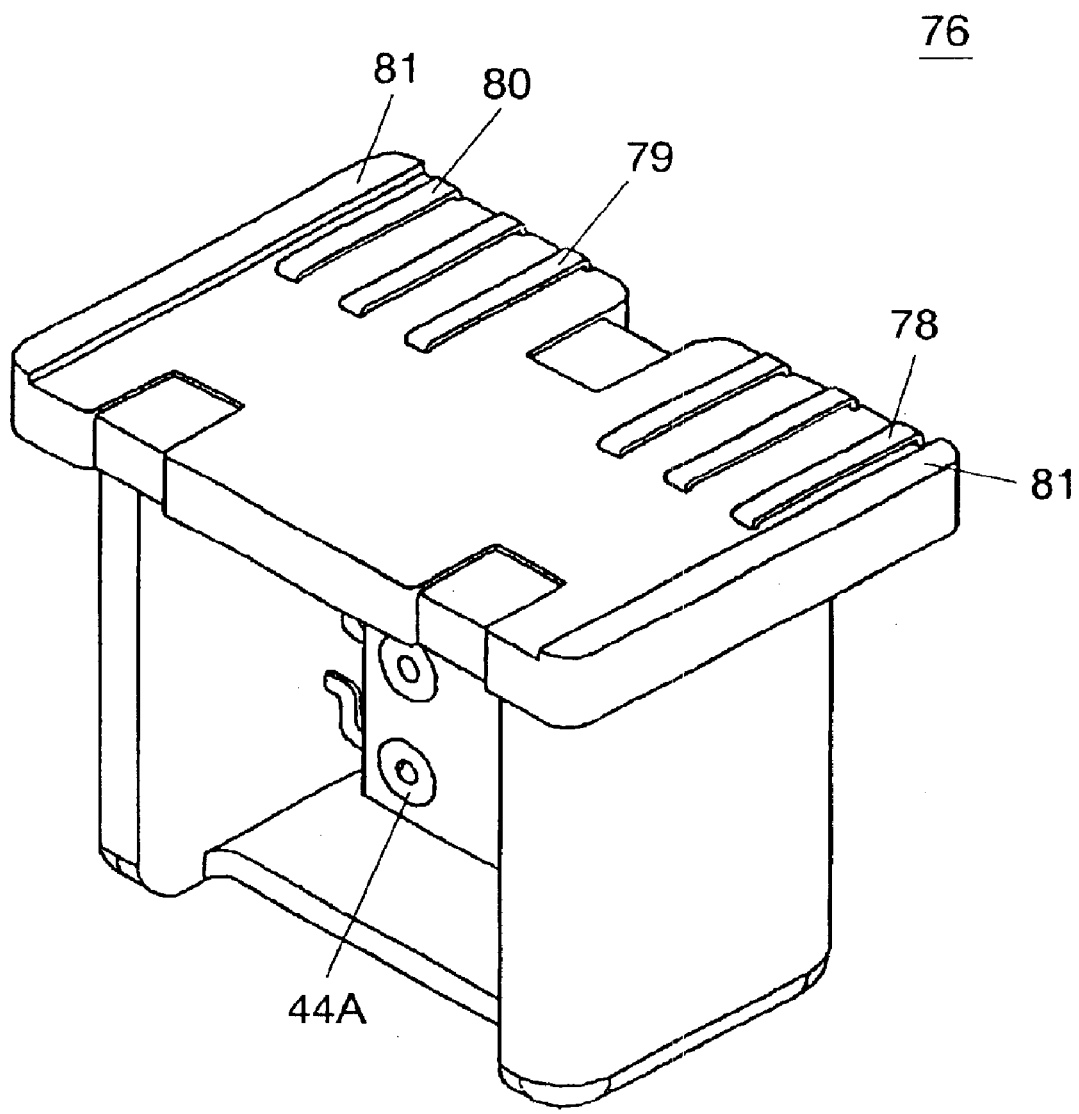
FIG. 18 is a perspective view seen from the rear side of the containing portion of the angular velocity sensor of the second exemplary embodiment of the invention.
Figure 19:
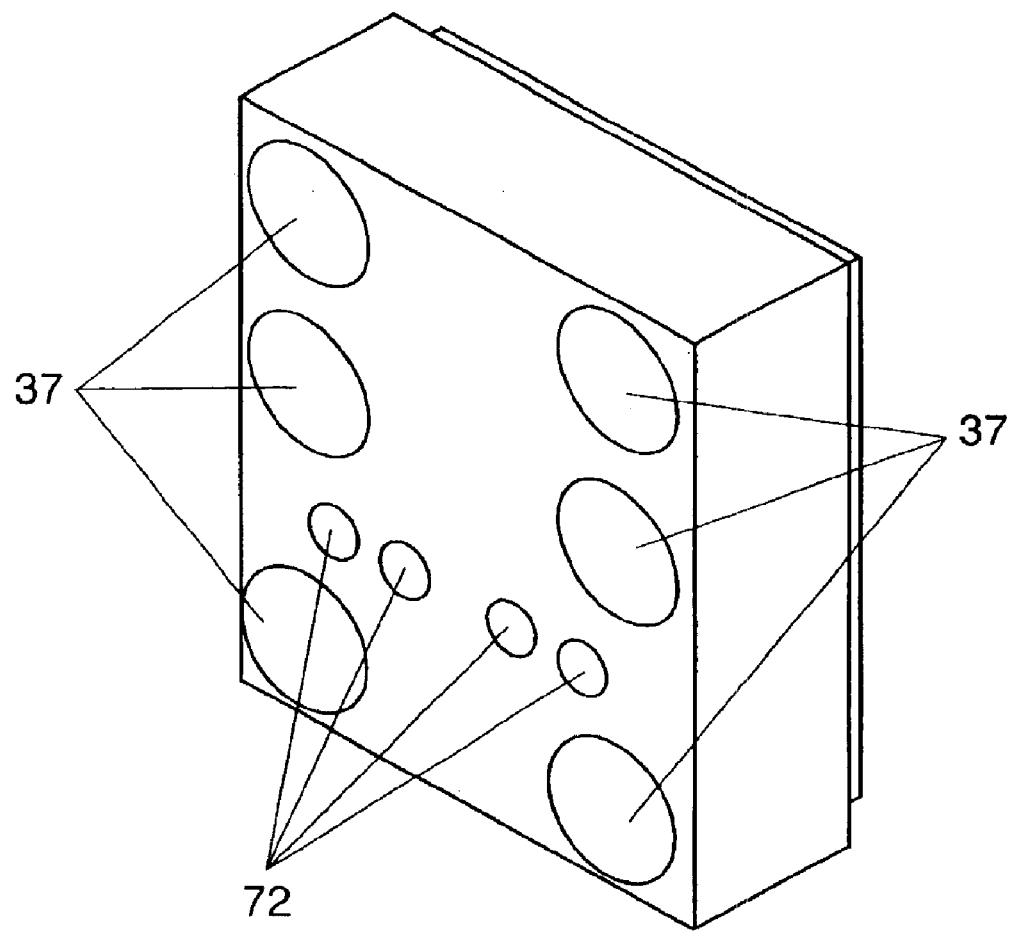
FIG. 19 is a perspective view of a case in the angular velocity sensor of the second exemplary embodiment of the invention.

FIG. 16 is an exploded view in perspective of an angular velocity sensor of the second exemplary embodiment of the present invention. FIG. 17 and FIG. 18 are a perspective view and a perspective view seen from the rear side, respectively, of a containing portion in the angular velocity sensor. FIG. 19 is a perspective view of a case in the angular velocity sensor. Components having corresponding configurations to those in the first exemplary embodiment are denoted by corresponding reference numerals and descriptions of the same are omitted.

The second exemplary embodiment is different from the first exemplary embodiment in that it has four capacitor electrodes 72 provided on the outer bottom face of case 71 as shown in FIG. 19. Further, as shown in FIG. 16, capacitors 73 are mounted on capacitor electrodes 72, while mount portion 74 is provided with hole 75, with capacitors 73 inserted through hole 75. Since capacitors 73 are provided within hole 75, a circuit configuration eliminating application of an external noise signal to the signal output from the angular velocity sensor can be formed small in size.

Figure 20:
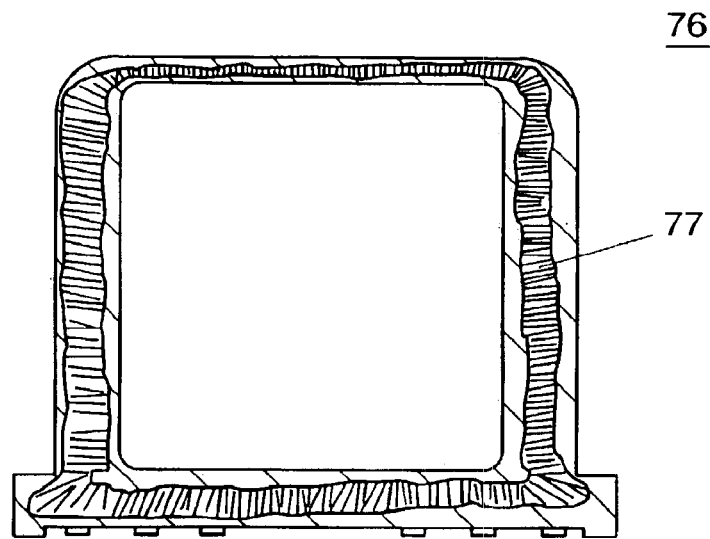
FIG. 20 is a lateral sectional view of the containing portion in the angular velocity sensor of the second exemplary embodiment of the invention.
Figure 21:
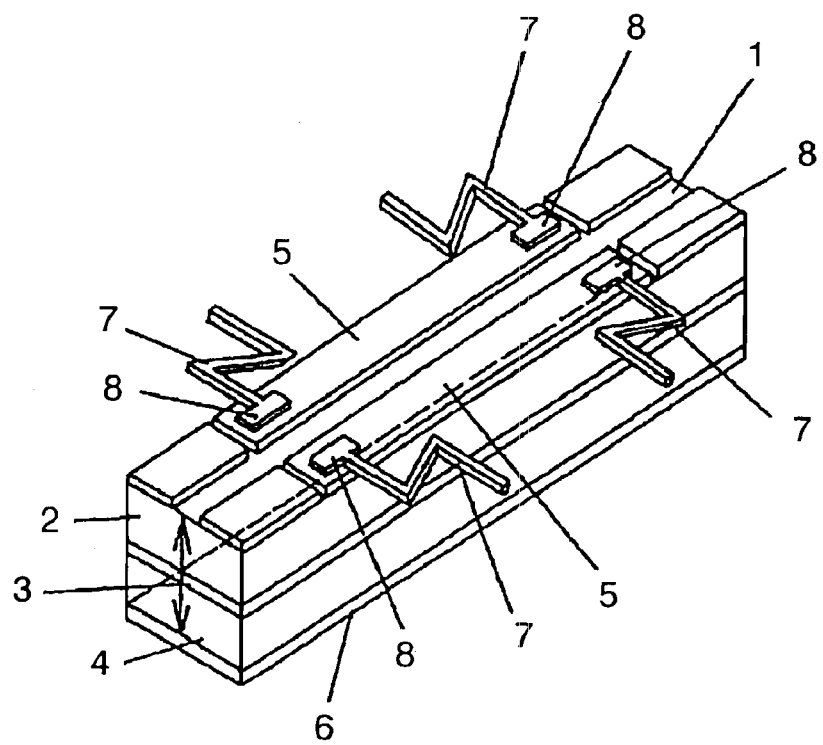
FIG. 21 is a perspective view of a conventional angular velocity sensor.
Figure 22:
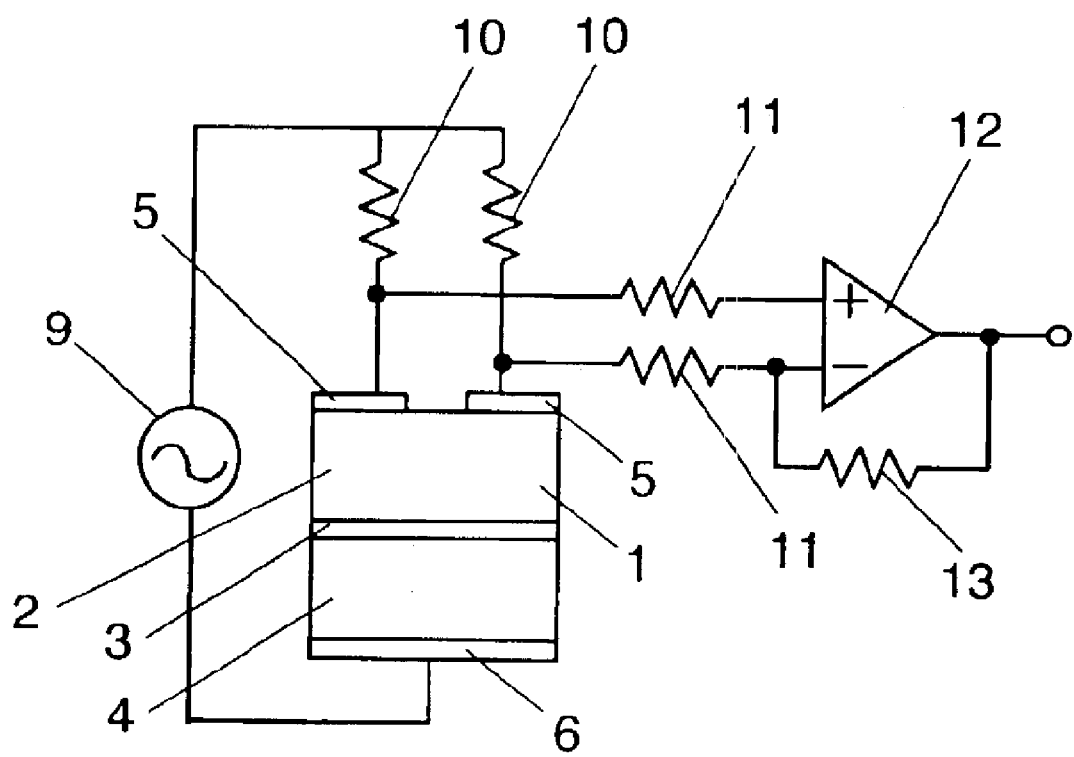
FIG. 22 is a circuit diagram of the conventional angular velocity sensor.

Further, as shown in FIG. 20, containing portion 76 in the second exemplary embodiment is made of a liquid-crystal polymer material having laminar structured portion 77. Therefore, vibrations are absorbed at interfaces between layers in laminar structured portion 77. As laminar structured portion 77 has high elasticity, anti-vibration characteristic and strength of containing portion 76 are improved.

Further, since a liquid-crystal polymer is used as the material having laminar structures constructing containing portion 76, laminar structured portion 77 can be provided by injection molding and, hence, containing portion 76 improved in anti-vibration characteristic and strength can be easily constructed.

Further, the second exemplary embodiment is configured, as shown in FIG. 18, such that, on both sides of the portion of containing portion 76 where power supply terminal 78, GND electrode 79, and output electrode 80 are disposed, there are provided protruded portions 81 protruding above electrodes 78, 79, and 80. The bottom face of the protruded portion is arranged to be perpendicular to the detecting axis of angular velocity. By virtue of the described configuration, when the angular velocity sensor is mounted on a substrate on the opposite side (not shown), protruded portion 81 on containing portion 76 is allowed to abut on the substrate on the opposite side (not shown). Thereby, the angular velocity sensor can be mounted perpendicularly to the substrate on the opposite side (not shown). Accordingly, the detecting axis of angular velocity in containing portion 76 can be oriented perpendicular to the substrate on the opposite side (not shown). As a result, the vector of the angular velocity applied to vibrator 21 becomes greater and, hence, no loss is produced in the output characteristic of the angular velocity sensor.

INDUSTRIAL APPLICABILITY

According to the present invention, the vibrator is received within a case and the case is arranged to be supported by surrounding terminals having the first ends thereof embedded in a containing portion. Therefore, the vibrator can be reduced in size and the vibrator can be securely retained by the case even if strong external vibrations are applied to the terminals. Thus, the strength retaining the vibrator is prevented from deteriorating and, hence, an angular velocity sensor small in size and having its output characteristic not deteriorated can be provided.

What is claimed is:

1. An angular velocity sensor comprising:
   a vibrator;
   a case receiving said vibrator;
   at least one terminal with a first end thereof connected with said vibrator; and
   a containing portion containing said case and having a second end of said at least one terminal embedded therein, wherein
   said case is supported within said containing portion by said at least one terminal so that said at least one terminal is operable to attenuate external vibrations transmitted to said vibrator.

2. The angular velocity sensor according to claim 1, wherein
   said at least one terminal comprises a plurality of terminals, and
   said case is supported within said containing portion by said terminals from surroundings thereof.

3. The angular velocity sensor according to claim 1, further comprising a mount portion mounting said case, located substantially in a center of said containing portion, and disposed substantially parallel to a detecting axis of angular velocity in said containing portion.

4. The angular velocity sensor according to claim 3, wherein said mount portion has embedded therein said first of said at least one terminal.

5. The angular velocity sensor according to claim 3, further comprising:
   at least one case electrode disposed on an outer bottom face of said case and electrically connected with said vibrator; and
   a front end portion of said at least one terminal exposed on said mount portion, wherein said at least one case electrode and said front end portion of said at least one terminal are electrically connected with each other.

6. The angular velocity sensor according to claim 1, wherein said at least one terminal has a bent portion.

7. The angular velocity sensor according to claim 1, wherein said containing portion is made of a resin material.

8. The angular velocity sensor according to claim 1, further comprising a metallic cover for covering said containing portion, said cover having an opening and an engagement claw provided at said opening, wherein said containing portion has a recess provided in an outer bottom face thereof and the cover is fixed in place with the engagement claw of the cover squeezed into the recess in said containing portion.

9. The angular velocity sensor according to claim 8, wherein the engagement claw of said cover bent into engagement with the recess in the outer bottom face of said containing portion is used as a connection portion with GND potential.

10. The angular velocity sensor according to claim 1, further comprising an electrode provided by having a front end portion on said second end of said at least one terminal exposed on a recess provided in an outer bottom face of said containing portion.

11. The angular velocity sensor according to claim 3, wherein said mount portion and said containing portion are made of identical resin material.

12. The angular velocity sensor according to claim 10, wherein said containing portion has protruded portions disposed on both sides of said electrode, protruding above said electrode, and having bottom faces thereof arranged perpendicular to a detecting axis of angular velocity.

13. The angular velocity sensor according to claim 1, wherein said containing portion is made of a material having a laminar structure.

14. The angular velocity sensor according to claim 13, wherein the material having a laminar structure is a liquid crystal polymer.

15. The angular velocity sensor according to claim 2, further comprising a mount portion mounting said case, located substantially in a center of said containing portion, and disposed substantially parallel to a detecting axis of angular velocity in said containing portion, wherein at least one terminal of said plurality of terminals is disposed parallel to the detecting axis of angular velocity in said mount portion and at least one of the other terminals is disposed in a direction perpendicular to the detecting axis of angular velocity.

16. The angular velocity sensor according to claim 15, wherein at least two terminals of said plurality of terminals are disposed on both sides of said mount portion in a direction perpendicular to the detecting axis of angular velocity.

17. The angular velocity sensor according to claim 3, further comprising a circuit for processing a signal output from said vibrator, wherein said mount portion is provided with a hole and components constituting said circuit are disposed therein.

18. The angular velocity sensor according to claim 1, wherein said vibrator is of a tuning-fork type.

19. The angular velocity sensor according to claim 1, wherein said vibrator includes a driving electrode and a detecting electrode.

20. The angular velocity sensor according to claim 1, further comprising a circuit for processing a signal output from said vibrator, wherein said circuit includes an IC.

* * * * *